(12) United States Patent
Raju

(10) Patent No.: US 9,218,399 B2
(45) Date of Patent: Dec. 22, 2015

(54) GLOBAL VALUE NETWORKS

(71) Applicant: Kanumuru Rahul Raju, Mumbai (MH)

(72) Inventor: Kanumuru Rahul Raju, Mumbai (MH)

( * ) Notice: Subject to any disclaimer, the term of this patent is extended or adjusted under 35 U.S.C. 154(b) by 52 days.

(21) Appl. No.: 13/715,243

(22) Filed: Dec. 14, 2012

(65) Prior Publication Data

US 2013/0179422 A1 Jul. 11, 2013

Related U.S. Application Data

(63) Continuation-in-part of application No. PCT/IB2012/050730, filed on Feb. 17, 2012.

(30) Foreign Application Priority Data

Feb. 18, 2011 (IN) ............................ 451/MUM/2011

(51) Int. Cl.
*G06F 17/30* (2006.01)
*G06Q 30/02* (2012.01)

(52) U.S. Cl.
CPC .......... *G06F 17/30554* (2013.01); *G06Q 30/02* (2013.01)

(58) Field of Classification Search
CPC ................... G06F 17/30544; G06F 17/30592; G06F 17/30595; G06F 17/305998; G06F 17/30601; G06F 17/30604
USPC .................................. 707/705, 736, 737, 740
See application file for complete search history.

(56) References Cited

U.S. PATENT DOCUMENTS

| | | | | |
|---|---|---|---|---|
| 2002/0010636 | A1* | 1/2002 | Immel | 705/26 |
| 2002/0040352 | A1* | 4/2002 | McCormick | 705/80 |
| 2002/0184065 | A1* | 12/2002 | Menard et al. | 705/7 |
| 2006/0200741 | A1* | 9/2006 | DeMesa et al. | 715/500 |
| 2008/0098313 | A1* | 4/2008 | Pollack | 715/753 |
| 2011/0191417 | A1* | 8/2011 | Rathod | 709/204 |

FOREIGN PATENT DOCUMENTS

| | | |
|---|---|---|
| CN | 101036366 | 9/2007 |
| CN | 101238434 | 8/2008 |

* cited by examiner

*Primary Examiner* — Hares Jami
(74) *Attorney, Agent, or Firm* — Vedder Price P.C.

(57) ABSTRACT

A method and system to develop a digital platform by organizing of data sets, interactions and communications of the participants in structured categories and thereby deriving value networks of any economic entity or industry comprising of individuals or groups or legal entities or any combination of those to facilitate, enhance and encourage evolving value network cycles commencing from value creation to value consumption. The platform may comprise a service database configured to store information associated with value networks, a user interface coupled with and configured to interact with the service database, a search engine coupled with the user interface and configured to perform searches in the service database, a catalog creation and updation module configured to create a catalog and store the same in the service database, said catalog comprising one or more data structures including but not limited to industry, sub-sectors, functions, sub-functions, supporting functions, and components; and further update the value networks thus created.

15 Claims, 19 Drawing Sheets

400

| PostMaster | Profiles | Pages | Marketplace | Careers | Information Net |

| Applications | Events | Social Responsibility |

Person 410
Group 420

430

| Basic | Contact | About |

Name [ ]     Members ID [ ]

Location  Country [▽]   Place [▽]   Industry  Select [▽]

Sub Sector  Select [▽]    Marketplace  Select [▽]

Sub Marketplace  Select [▽]    Offerings  Contact [▽]

Upload Logo/Picture [ ]

Fig 4

| PostMaster | Catalog | Pages | Profiles | Marketplaces | Info Net | Careers | Applications |

995 Persons
Groups

LOCATION: Catalog >Food Industry>Finance>Funds>Marketplace>Product/Service

INDUSTRY FOOD
FUNCTION
SUBJECT PORTAL

FINANCE MARKETPLACE 996
Integrated financial services
Financial Strategy & Planning services
Funds and Funding services
Financial Management services

SUPPORT SERVICES 997
Procurement
People
Systems & Processes
Knowledge
Legal
Regulation
Waste Management
Network

| Popular filters 991 | Micro filters 992 | Related 993 |
|---|---|---|
| 9921<br>Most Popular<br>Recent<br>Most tracked<br>Most emailed/forwarded<br>Most commented | Subsector ▼<br>Product ▼<br>Specifications ▼ | Career<br>Information Net<br>Applications<br>Events<br>Social Responsibility |

+ Add (151) Matches Found!    998

Name         Views        Rating
Specs...     posted
comments
By:          mssg

1310 Preview XYXYXY Industry Catalog

My desk

Brief Description | XYXYXY is a $zz industry 1320

Subsector | Brim | Tin
1330

Description 1340 ▼

Marketplaces
1350

☐ Marketplace 1    ☐ Marketplace n
☐ Marketplace 2    ☐ Marketplace Xyz Dym

1351

Brief Description | Definition: xyz is......
1360

Marketplaces: Support and Subcomponents

1370

Xyz marketplace
111    222
1111

1001    1002
10011

← 1371
← 1372

Select to Edit 1380 | Save

Add icons for new 1390 ▶ Browse gallery

Skip

Fig. 13

GLOBAL VALUE NETWORKS

RELATED APPLICATIONS AND INCORPORATION BY REFERENCE

This application is a continuation-in-part application of international patent application Serial No. PCT/IB2012/050730 filed Feb. 17, 2012, which was published as PCT Publication No. WO/2012/110984 A2 on Aug. 23, 2012, which claims benefit of Indian Patent Application No. 451/MUM/2011 filed Feb. 18, 2011.

The foregoing applications, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention generally relates to Information technology databases and more particularly relates to web-based system and method for creating a digital platform to facilitate and create global value networks among users interacting with each other.

BACKGROUND OF THE INVENTION

Computers increasingly serve as tools through which people interact and communicate with each other. As a result, many types of networks have developed to facilitate communication, transaction and interaction. Such network types include, for example, social networks, business networks, education networks, commerce networks, political networks, and so forth.

A value network is a complex set of social and commercial relationships. Value networks exhibit interdependence. Value networks work via relationships to offer, seek, create and/or transact social goods (public goods) or economic goods (commercial goods). Value is created through exchange and the relationships between roles and takes the form of knowledge, other intangibles and or tangibles. Value networks account for the overall worth of products and services. Value networks operate in public agencies, civil society, in the enterprise, institutional settings, and all forms of organization. Value networks advance innovation, wealth, social good and environmental well-being.

Physical networks exist for commercial goods across industries, functions and so on. Individual companies have both internal and external value networks. External facing networks include customers or recipients, intermediaries, stakeholders, complementary, open innovation networks, suppliers etc. Internal value networks focus on key activities, processes and relationships that cut across internal boundaries, such as order fulfillment, innovation, lead processing, or customer support.

Digital products like CRM (customer relationship management), ERP (enterprise resource planning), SCM (supply chain management), Productivity tools (like word processing, spread sheets, email etc.) and corporate social networking tools exist and are being improved constantly to address the needs of the enterprise and few other forms of organization.

Though different kinds of offerings exist both in free and paid, in digital, soft and physical forms, they do not use the full potential of what's possible using information technology, connectivity (like Internet) and crowd sourcing in advancing innovation, efficiency, wealth, social goods and environment and social well-being across individuals, groups, companies, other forms or organization, public agencies, government and civil society.

Therefore, there arises a need for a system and a method that enables creation as well as usage of global value networks in digital form.

Citation or identification of any document in this application is not an admission that such document is available as prior art to the present invention.

SUMMARY OF THE INVENTION

It is a principle object of the present invention to develop a digital platform using the power of Information Technology, connectivity (internet, mobile etc.) and crowd sourcing to capture value interactions generated by interactions either online or otherwise by and between the participants including individual(s), organization(s), group(s), society(ies), public agency(ies) either civil or Government etc. on a virtual platform organized in structured categories.

Yet another objective of this invention is to develop a digital platform to facilitate, enhance and encourage evolving value network cycles commencing from value creation to value consumption—covering every step and action in the process, either before or after or in-between the cycle, by methods provided for user interactions wherein such value cycles have commercial and/or noncommercial objectives across any discipline of work including goods, services, value chain functions (direct and supporting), and so on.

Yet another objective of this invention is to develop a digital platform to enhance Speed, Quality, Reliability and Flexibility of the Value Cycle and to reduce costs and time to users.

Yet another objective of this invention is to develop a digital platform to provide content, tools, structures, networks and incentives (like revenue, recognition and reputation earning) to enable crowds to participate in achieving the above objectives.

Yet another objective of this invention is to develop a digital platform to deliver highly targeted and desired advertising over the value networks to users.

Yet another objective of the present invention is to develop a digital platform to provide a method to involve users continuously by methods such as earning rewards or recognition.

To meet the above objects and others, the present invention provides a novel digital platform that captures and enables value interactions by and between various participants on a virtual platform offering Structures, Tools, Content, Networks and Incentives across the value cycle from value creation to value consumption—covering every step and action in the process including in-between, before and after the cycle.

Accordingly, the present invention relates to a method of creating a catalog, representing structures of value networks across products, services, subjects, industries and so on, stored in a service database. In one embodiment, the method comprising the steps of: (a) creating one or more primary entities, (b) creating one or more component entities for each primary entity, each component is one of sub component and supporting component; creating sub-component or supporting component for each of the sub-component and supporting component thus created in step (b); repeating step (c) for each of the sub-component or supporting component, wherein each of the primary entity, sub-component and supporting component is created based on predetermined conditions.

Further, the present invention relates to a platform comprising: a service database configured to store information associated with value networks across products, services, subjects, industries and so on, a user interface coupled with and configured to interact with the service database, a search engine coupled with the user interface and configured to perform searches in the service database, a catalog module configured to create a catalog, update and store the same in the service database, said catalog comprising one or more data structures including but not limited to primary entity and components of each primary entity, each component is one of subcomponent and supporting component. Further, platform comprises a role mapping module configured to map the value networks with the users interacting with the platform.

Furthermore, the present invention relates to a method of mapping of users to value networks. In one embodiment, the method comprising: receiving one or more interactions from users/entities and storing the interactions thus received in a service database, evaluating the interactions based on one or more predetermined conditions stored previously in the service database, determining the role of each user/entity on the basis of evaluation of the interactions, and mapping each user/entity against the role thus determined thereby mapping the users onto the completely new or existing value networks.

In addition, the present invention relates to a system comprising: a storage medium for storing computer-readable code; and a processor for executing the computer readable code, the computer-readable code when executed, causing the processor to perform operations. In one embodiment, the operations comprising (a) creating one or more primary entities, (b) creating one or more component entities for each primary entity, each component is one of sub-component and supporting component, creating sub-component or supporting component for each of the sub-component and supporting component thus created in step (b) and repeating step (c) for each of the sub-component or supporting component, wherein each of the primary entity, subcomponent and supporting component is created based on predetermined conditions.

Further still, the present invention relates to a system comprising: a storage medium for storing computer-readable code; and a processor for executing the computer-readable code, the computer-readable code when executed, causing the processor to perform operations. In one embodiment, the operations comprising: receiving one or more interactions from users/entities and storing the interactions thus received in a service database, evaluating the interactions based on one or more predetermined conditions stored previously in the service database, determining the role of each user/entity on the basis of evaluation of the interactions, and mapping each user/entity against the role thus determined thereby mapping the users onto the completely new or existing value networks.

Accordingly, it is an object of the invention to not encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. §112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings. One or more embodiments of the present invention are now described, by way of example only, with reference to the accompanied drawings wherein like reference numerals represent like elements and in which:

FIG. 4 illustrates a screenshot of a typical user's screen for user registration constructed in accordance with the principles of the present invention.

FIG. 9B illustrates an exemplary screenshot of user interface of a specific selection of global value networks in accordance with an embodiment of the present invention.

FIG. 13 illustrates an exemplary screenshot showing an exemplary implementation of the method for preview and addition of icons in accordance with an embodiment of the present invention.

DETAILED DESCRIPTION OF THE INVENTION

Figure 1A:
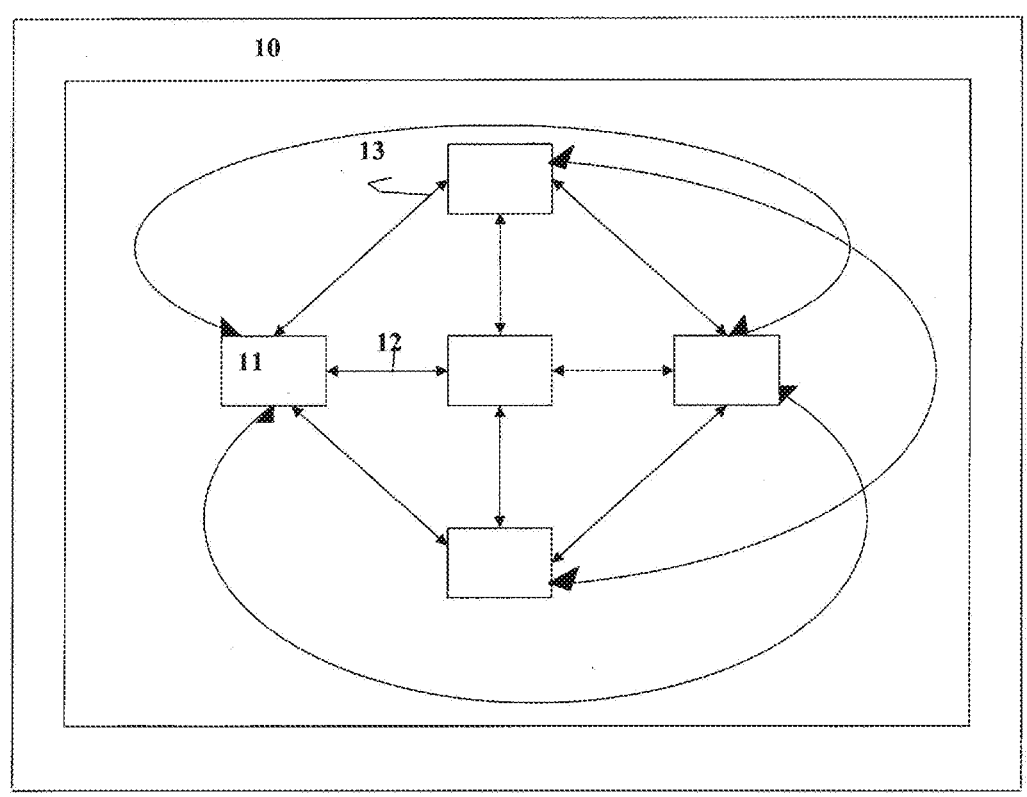
FIG. 1A is a schematic block diagram of an overview of value networks constructed in accordance with the principles of the present invention.

Although the present invention and its advantages have been described in detail, it should be understood that various changes, substitutions and alterations can be made herein without departing from the spirit and scope of the invention as defined in the appended claims.

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the invention, reference is made to the accompanying drawings that form a part thereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following description is, therefore, not to be taken in a limiting sense.

FIG. 1A is a schematic block diagram of an overview of value networks constructed in accordance with the principles of the present invention.

In one embodiment, value networks 10 can be of product/service or subject or industry or any other element and comprised of major three components actors 11, interaction 12, and output/result 13. In one aspect, the actors 11 may be a service provider, customer or 1st tier supplier or 2nd tier supplier or auxiliary supplier. The interaction 12 may be an exchange of any kind through comments, reviews, discussions, messages, Question & Answer or any other activity and the output or result 13 may be for example document or multimedia or knowledge or actual product.

Figure 1B:
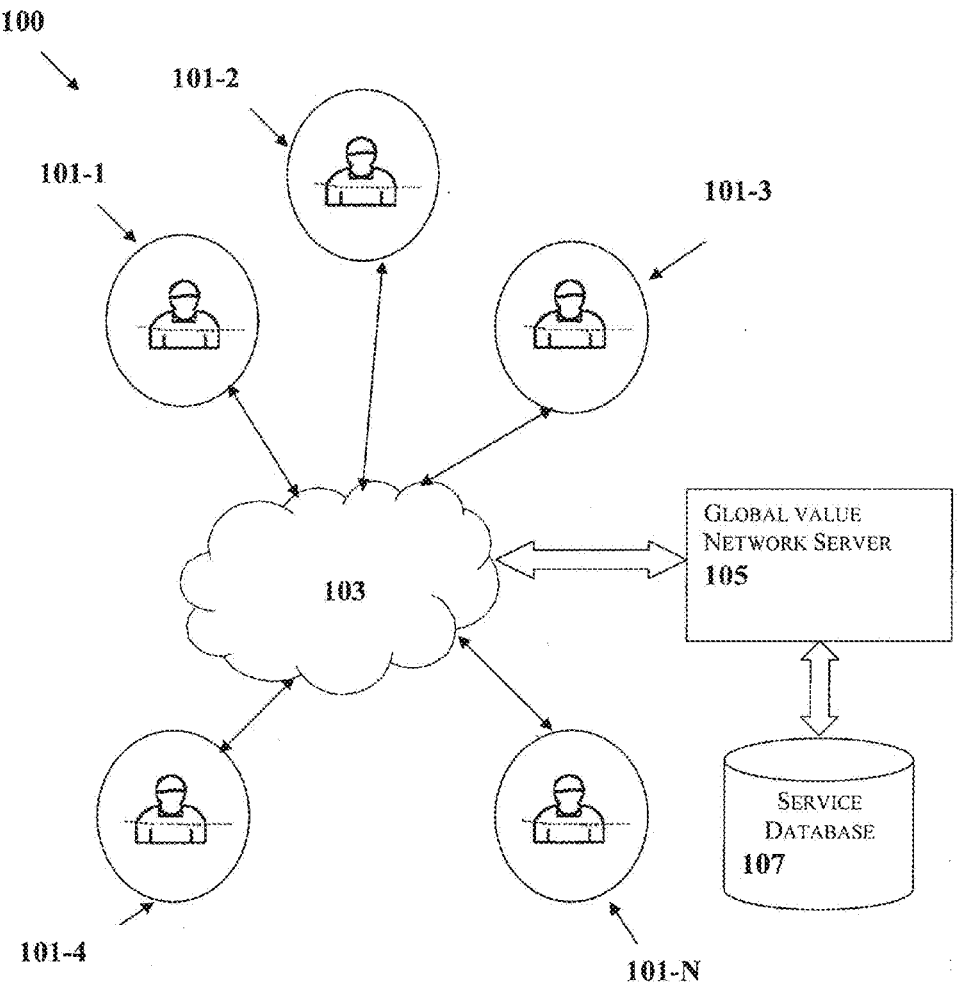
FIG. 1B illustrates a schematic architecture diagram of system that facilitates global value networks in accordance with an embodiment of the present invention.

FIG. 1B illustrates a schematic architecture diagram of system (100) that facilitates global value networks in accordance with an embodiment of the present invention.

The system (100) as shown in FIG. 1B may be a dedicated set of hardware or merely a collection of resources from within one or more other systems. Further, the system has several components shown as separate entities, but may actually consists of several different functions of one entity, and any combination in between.

In one embodiment, the system (100) comprises of one or more users 101-1, 101-2 . . .

101-N and so on (collectively referred to as user 101) interacting via a network (103). The system (100) further comprises a Global Value Network (GVN) server (105) connected with the users (101) via the network (103). The GVN server (105) is operatively coupled with a service database (107) for storing information associated with users (101) and value networks (101).

The user (101) accesses the GVN server (105) by means of a desktop personal computer, workstation, laptop, PDA, cell phone, or any WAP-enabled device or any other computing device capable of interfacing directly or indirectly to the Internet or other network connection. The user device typically includes one or more user interface devices, such as a keyboard, a mouse, touch screen, pen or the like, for interacting with the GUI provided on a display. Further, the user device includes a graphical user interface (GUI) provided therein for interacting with the GVN server (105) to enable value networks.

The user (101) interacting with the GVN server (105) is interchangeably referred to as actor of a value network and provided with roles that can either be a service provider, customer, first tier supplier, second tier supplier, auxiliary supplier and so on. In one embodiment, a user may be assigned with a role of a service provider interacting with an end customer and the user can be assigned with a role of the first tier supplier supplying the necessary product/service to the service provider. In another embodiment, the user may be assigned with a role of second tier supplier supplying the intermediate product/service to the first tier supplier. In yet another embodiment, the user may be assigned with a role of auxiliary supplier for supporting the service provider, the first tier supplier and the second tier supplier in services other than those being provided directly to the customer. It is to be noted that here the term 'service provider' includes providers of products as well as providers of services.

The network (103) can be a LAN (local area network), WAN (wide area network), wireless network, point-to-point network, or other configuration. One of the most common types of network in current use is a TCP/IP (Transfer Control Protocol and Internet Protocol) network for communication between the users and GVN server (105). Other common Internet protocols used for such communication include HTTP, FTP, AFS, and WAP etc.

The GVN server (105) includes a desktop personal computer, workstation, laptop, PDA, cell phone, or any WAP-enabled device or any other computing device capable of interfacing directly or indirectly to the Internet or other network connection. The GVN server (105) may include at least one processor with associated system memory, which may store, for example one or more databases. The server may further include additional memory, which may, for example, include instructions to perform various operations. The server memory and other memory may comprise separate memory devices, a single shared memory device or a combination of separate and shared memory devices. The server typically includes one or more user interface devices, such as a keyboard, a mouse, touch screen, pen or the like, for interacting with the GUI provided on a display. Further, the GVN server (105) is operatively coupled and configured to interact with a service database (107).

The service database (107) is configured to store information related to value networks such as user profile, and interactions between users, content, catalog, and specific output of the interactions made between the users. Further, the service database (107) is configured to store predetermined conditions and rules that determine the role of each user based on the conditions. Furthermore, the service database (107) is configured to store predetermined conditions relating to each element and components of catalog for enabling the creation of catalog.

According to the present invention, the user (101) is connected to the GVN server (105) through user interface available for interacting with the GVN server (105) to perform interactions such as keying in inputs, sort or filter options to extract meaningful contextual information from the service database (107) by means of applications such as for example—a search engine. Similarly other applications are used for other purposes. In another embodiment, the user may also search the service database (107) for actor(s) such as service provider or a first tier or a second tier or an auxiliary supplier providing a specific product or service by means of the search engine. The user (101) may further select the appropriate actor(s) and perform interactions with the selected actor(s) to generate specific outputs.

On performing the interactions, the GVN server (105) stores and processes the interactions stored in the service database (107), and determine roles of each user involved in the said interactions. Roles are determined based on predetermined conditions stored in the service database (107) and upon determination of roles, the users are assigned/mapped with the determined roles of the network. In one example embodiment, users mapped to predetermined roles form a new value network or part of an existing value network which was already created and linked to the GVN server (105) via the network (103).

Figure 2:
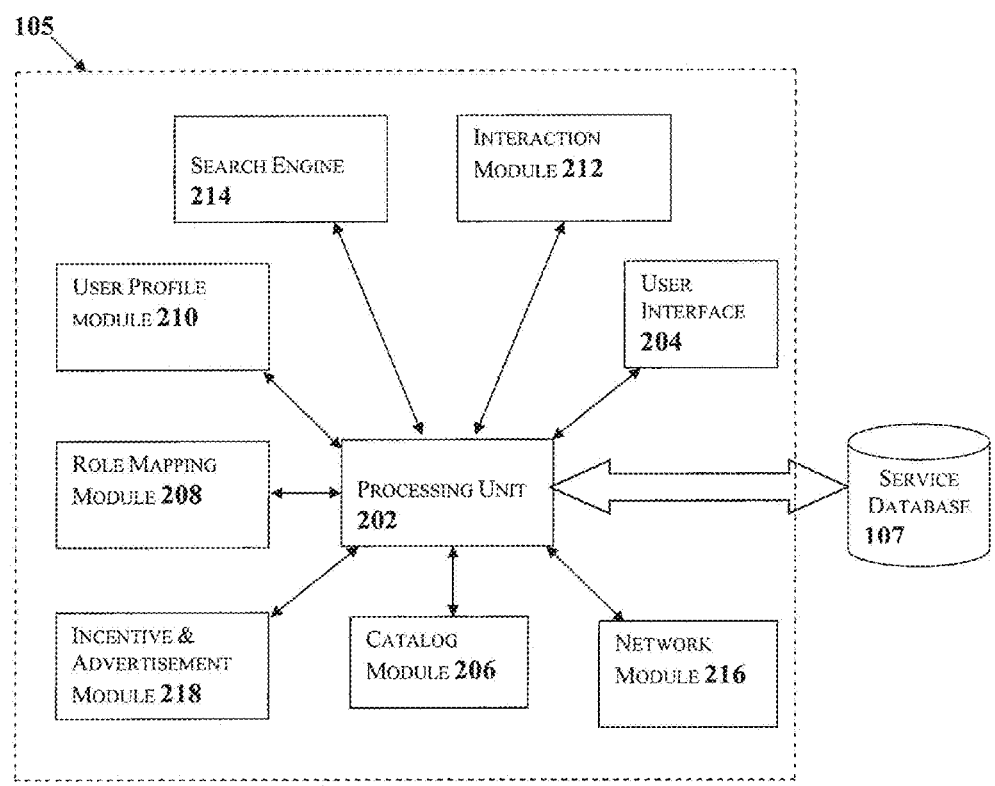
FIG. 2 illustrates a schematic block diagram of the system for enabling value network in accordance with an embodiment of the present invention.

FIG. 2 illustrates a schematic block diagram of the system for enabling value networks in accordance with an embodiment of the present invention.

The GVN server (105) as shown in FIG. 2 includes one or more modules implemented as any appropriate combination of software and/or hardware located at one or more locations. For example, modules may be operating on one or more user devices either separated or may be integrated. The modules and associated functions of each module may be implemented using any suitable number of modules, and functions described as being performed by one module may be performed by any other suitable module in whole or in part.

In one embodiment, the GVN server (105) includes a processing unit (202) configured for controlling all the modules interacting with the processing unit (202) and further configured to enable the access of the service database (107). The processing unit (202) can be a conventional processor or a specific dedicated processing unit configured to perform execution of tasks or instructions associated with the modules. Further, the GVN server (105) includes a user interface (UI) (204) configured to enable interfacing of the user (101) with the built-in modules of the GVN server (105). By means of the user interface (204), the users (101) may perform an interaction for an example, request for data, and request for transaction information or display of data.

The GVN server (105) further includes a catalog module (206), a user module and a role mapping module (208). The catalog module (206) comprises a catalog creation module and a catalog updation module. The user module comprises a user profile module (210), an interaction module (212), a search engine (214), a network module (216) and an incentive & advertisement module (218).

The user profile module (210) comprises a user registration and updation module, and a user login module. In one aspect, the user registration and updation module is configured to register the users (101) with the GVN server (105) by creating a user account/profile for the user (101). User (101) may be an individual, or a group of individuals or an organization. Profile data of user (101) may include but not limited to business related data, personal data and access preferences, said profile data of each user is accessible to different members based on each user's own access preferences. Further, the user registration and updation module is configured to update the profile thus created. The user login module is configured to validate the authentication of the user login thereby enabling the user to login onto the platform provided by the GVN server (105).

The user profile module (212) further comprises tools to create, edit, delete, classify, post profile of individual(s), groups, organizations, and manage privacy of posts and further comprises tools to browse, track, follow, create, invite, collaborate, add, edit, delete, group people, groups, organizations and so on. Furthermore, the user profile module (212) comprises tools to track changes in the user's value networks, subscribe or unsubscribe from the value networks and track applications associated with the value networks. The user (101) must be a registered user for accessing the GVN server (105) and the user login module is configured to validate the user name and password assigned to the users at the time of logging onto the GVN server (105) via the UI (204).

Users may also be provided with a preference of creating or editing catalog. In one embodiment, the catalog creation module is configured to enable user (101) to create a structured catalog in a predefined manner and store the same in the service database (107).

The catalog creation module is configured to create catalog i.e., the structure of value networks so that users (101) may interact and create value by means of interactions with the help of value network structure thus created. Catalog may include internal and external catalog. In one embodiment, the catalog creation module enables creation of catalog that includes but not limited to goods and/or industries and/or value chain functions (direct and indirect) and/or subjects/disciplines and/or directly content categories.

In one embodiment, the catalog creation module is configured to create one or more primary entities based on predetermined conditions stored in the service database (107). Primary entities include but not limited to industry, value chain functions, subject, discipline, service, or product or direct content category. Further, the catalog creation module is configured to create one or more component entities for each primary entity based on predetermined conditions stored in the service database (107), said each component is one of sub-component and support component. In one aspect, each primary entity comprises both sub-component and supporting component. In another aspect, each primary entity comprises at least a sub-component and optionally a supporting component.

Further based on the predetermined conditions, the catalog creation module is configured to create sub-component and supporting component for each of the subcomponent and supporting component thus created and continuously repeat creating the sub-component and supporting components.

In one aspect, the primary entity may be for example, an industry. The catalog creation module is configured to create catalog comprising industry, sub-sectors, functions, sub-functions, supporting functions, and components. In this aspect, the catalog creation module is configured to create the structure of the catalog so that each industry is sub-divided into one or more sub-sectors, each sub-sector is subdivided into one or more functions, each function is sub-divided into one or more sub-functions and one or more support functions and each of the sub-function and support function are further sub-divided into one or components.

The catalog may comprise one or more industries, let us consider for example, farming industry or food industry or health care industry. Further, the industry may be divided into multiple sub-sectors such as for example, organic farming, dairy farming, cattle farming, and poultry farming and so on. Furthermore, each sub-sector may be divided into multiple functions related to each sub-sector and each function may be divided into sub-functions and supporting functions. Functions can be a sub-function that is primary and essential to a sub-sector. For example, in an automobile industry, sales can be a function and after-sales maintenance can be its sub-function. Functions also be supporting functions if that function provide secondary support to the subsector for example, accounting, financing can be supporting functions providing auxiliary support to the sales. Functions that are direct are referred to as sub-functions and functions that are indirect are referred to as supporting functions. Furthermore, the sub-functions and supporting functions may be divided into one or more components and so on.

The catalog updation module is configured to perform operations on the already created catalog structure, said operations comprising adding, modifying, deleting entities selected from one of primary entity, sub-component and supporting component. Further, the catalog updation module also comprises tools configured to edit, delete, track, browse, view and use catalog structures.

The catalog module (206) enable users (101) to create/edit and update catalog based on user preferences provided by an administrator. For this purpose, the catalog module (206) comprises a user admin module configured to provide users (101) with one or all of the permissions to create/edit the catalog. Each user is also given permission or a preference or a priority to view/use the catalog. In other words, a user may be given rights by the administrator to create/edit the catalog structure.

For editing the catalog, the user may access the catalog directly by using the search engine (206) or indirectly by browsing down through each element in the catalog. In one embodiment, the user searches the desired catalog element using the search engine (214). The search engine (214) receives a user query or search keyword from the user (101), processes the search query and displays the search results obtained from the service database (107) to the user (101) who initiated the search process. In an example, if the user needs to access poultry farming sector to perform some interactions or to know more about poultry farming, the user (101) may search by providing the exact name as search query/keyword and obtain the results relating to the search keyword i.e., poultry farming in this example. The search results are displayed to the user (101) via the user interface (204). Based on the search results, the user (101) may access the desired catalog element and edit or modify the catalog structure.

Catalog thus created represent static value networks and become dynamic value networks when users interact with each other and exchange valued interactions among them. The interaction module (212) is configured to enable the user interactions and stimulate value network(s) by capturing the values present in the interactions exchanged between the users. User interactions include but not limited to a selection of catalog elements such as primary entity, sub-component and supporting component or further sub-component and supporting component and so on. The selection of a particular catalog element can be made directly by searching through search engine (214) or by accessing the entire catalog structure and browsing through appropriate industry and then selecting the required sector and further browsing to reach the required catalog element. The user and the selected entity or catalog element shall be the source and target entity or users for an interaction.

The interaction module (212) comprising a transaction module configured to enable one or more interactions between source and target users including but not limited to transactions, trading, buying, selling, and/or offering. In one aspect, the transaction module comprises one or more tools to post needs and offerings and to buy, sell, trade needs and offerings.

The interaction module further comprising a content module configured to enable creation and sharing of content obtained via interactions among users (101). In one embodiment, the content module is configured to create, post, edit, delete, track, browse, filter, list, view, exchange and use of content. Content will include but not limited to (internal and external content) ideas and concepts and/or product and/or service and/or project and/or documents and/or audio and/or video and/or bookmarks and/or snippets and/or how to guides and/or news and/or articles and/or knolls and/or numbers and charts and/or books and publications and/or blogs and/or discussions and/or debates and/or questions and answers and/or experts and/or jobs and/or events. Content can be accessed from within the catalog structures, advertisements and/or searches.

In one embodiment, the content module comprises one or more means or tools to create and edit content. In one embodiment, the content sharing module comprises means to post, edit and delete content within and outside the value network, means to visualize, analyze and track content changes, means to classify content, means to manage privacy of content, means to rate and comment on content, means to share and recommend content within and outside the network, means to create fields to classify and list the content, means to filter, visualize content listings and related listings in different ways and means to read, copy, edit, save content in the service database.

The GVN server (105) further comprises the role mapping module (208) configured to determine role of each user interacting with the GVN server (105) and map the user in the network based on the role thus determined. In one embodiment, the GVN server (105) receives one or more user interactions via the user interface (204) and store the interactions thus received in a service database (107). The role mapping module is configured to evaluate the interactions thus received based on one or more predetermined conditions stored previously in the service database (107). Further, the role mapping module is configured to determine the role of each user on the basis of evaluation of the interactions and map each user against the role thus determined thereby mapping of users on a completely new or existing value network.

In one embodiment, the role mapping module is configured to determine the role of each user by determining a source user/entity and a target user/entity involved in each interaction and then determining a degree of separation between the source and target users/entities based on the evaluation of the interaction. After determining the degree of separation, the role mapping module assigns a predetermined role to each of the source and target users/entities based on the degree of separation thus determined or based on the position of selection in the catalog, thereby allowing the user to become part of the value network.

Furthermore, the network module (216) comprises a network creation and updation module configured and comprising of tools to create networks or groups, track changes in the user's networks or groups, subscribe or unsubscribe from the networks or groups and track applications associated with the networks or groups. In one embodiment, the network updation module comprises one or more tools/means including but not limited to means to visualize and track changes and actions of networks, means to manage communications with networks, means to create, edit, post, delete content as a group/network, means to add, delete, group, visualize, list and track desktop widgets and means to add, delete, group, visualize, list and track applications.

The aforementioned interactions are communicated between users via a communication module of the interaction module (212) coupled with the processing unit (202). The communication module establishes communication link between users thereby enabling them to share content, or to exchange transaction information via one or more communication modes available. In one instance, the communication module enables communication between users via email, short messaging services (SMS), voice mail and so on.

The incentive and advertisement module (218) is configured to provide incentives to users interacting with the value networks and further configured to enable/disable display of advertisements posted by users or sourced from outside the system. In one embodiment, the incentive and advertisement module (218) is configured to provide incentives or points or ranks to users based on determination of role of each user, and number and type of interactions made by the user in the value networks. Based on the determination, the user is provided with incentive or free publication of advertisement posted by the user or recognition of the user by displaying the user name via the user interface (204) to all users. The incentive and advertisement module (218) may comprise one or more tools including but not limited to tools to create, post, edit, delete ads (text and/or audio and/or video and/or picture ads) internally and outside and tools to visualize, analyze and track ad interactions and effects, so on.

One or more users register with the GVN server (105) to participate in value networks. Users register via the user registration and updation module that creates a user profile and provides a unique password for logging onto the user interface (204) of the GVN server (105). Further, every registered user is allocated with a predefined storage space in the service database (107) for storing personal and business information of the user. Once the user is logged onto the user interface (204) of the GVN server (105), the user may or may not edit the catalog structure based on the user's preferences. If the user is given the preference of editing catalog structures, the user may edit the catalog via the tools available with the catalog updation module. If the user is not given such preference to edit or alter the structure, then the user may directly be involved to participate in the value networks.

The value network thus created by the catalog creation module is activated or stimulated when users (101) interact with each other. Interactions can be sharing content, performing transactions or communicating other users and so on. In one embodiment, the interaction module enables the interactions between the users and the role mapping module maps the user to a completely new or existing value networks. The role mapping module receives the interactions and stores them in the service database (107). Further, the role mapping module processes the stored interactions, determine the role of users involved in the interactions, and then map them with predefined role thereby activating a completely new or already created value networks. Any changes in the value network structure such as addition or withdrawal of users in the existing network may be updated by the catalog updation module. The incentive and advertisement module (216) provides the necessary incentives to users and publication of advertisements based on the users need.

Figure 3:
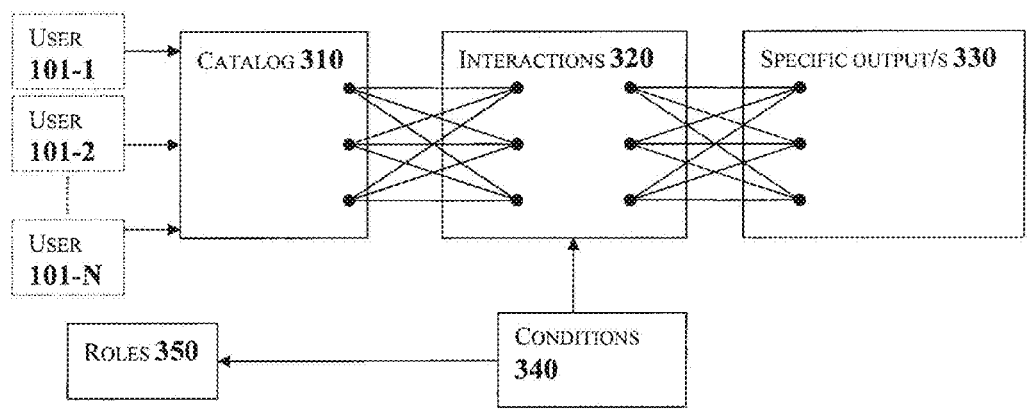
FIG. 3 illustrates a schematic illustration of a service database in accordance with an embodiment of the present invention.

FIG. 3 illustrates a schematic illustration of a service database in accordance with an embodiment of the present invention.

The service database (107) as explained above is either coupled with the GVN server (105) or integrated within the GVN server (105) and accessed by one or more users (101) via the user interface (204). The service database (107) is configured to store data such as catalog (310), interactions (320) and specific output(s) (330). Further, the service database (107) is configured to store predetermined conditions (340) that are used to determine the role of users and roles (350) that are determined and assigned to users (101).

In one embodiment, the catalog creation module enables creation of catalog (310) which the users (101) access either directly by browsing the structure of the catalog or indirectly through the search engine (214). The data structure of the catalog as defined in the aforementioned paragraphs, comprises of one or more elements including but not limited to primary entity, and components of primary entity. Components of primary entity may be a sub-component or a supporting component. Further, each of the sub-component and supporting components may further comprise further subcomponents and further supporting components and so on.

In one aspect, each primary entity comprises both sub-component and supporting component. In another aspect, each primary entity comprises at least a subcomponent. In one aspect, the primary entity may be for example, an industry and the catalog creation module is configured to create catalog comprising industry, subsectors, functions, sub-functions, supporting functions, and components.

The structure of the catalog (310) may be altered by users via the catalog updation module. The user (101) may interact with users associated with a particular catalog element in the value networks.

Interactions (320) comprise one or more categories of the type of activity performed by the users (101). In one embodiment, the interactions (320) include but not limited to exchange of information or exchange of transaction or at least communication between the users (101). The interactions (320) are initiated by the users via the user interaction module. The role mapping module processes the interactions (320) and generate specific outputs (330). Specific outputs (330) include one or more categories of output type classified in the service database (107). For example, specific outputs (330) include output types such as documents, or knowledge or information by expert for example, or email or SMS messages based on the type of interaction made by the users (101). The role mapping module processes the interactions (320)

based on predetermined conditions (340) stored in the service database (107) to determine the source and target users for any interaction. Based on the conditions, the source and target users are determined for each interaction and the role mapping module determines roles (350) of the users involved in the interactions (320).

Roles (350) assigned to users (101) can either be a service provider, customer, first tier supplier, second tier supplier, auxiliary supplier and so on. In one embodiment, a user can be assigned with a role of a service provider interacting with an end customer or the user can be assigned with a role of the first tier supplier supplying the necessary product/service to the service provider. Further, the user can be assigned with a role of second tier supplier supplying intermediate/semi-finished product/service to the first tier supplier. The role of an auxiliary supplier is identified as the user supporting the service provider, the first tier supplier and the second tier supplier in services other than those being provided directly to the customer. The role mapping module determines the roles of users and map the users against appropriate roles of the value network.

FIG. 4 illustrates a screenshot of a typical user's screen for user registration constructed in accordance with the principles of the present invention.

The user registration module of the user profile module (210) enables registration of new users. The screenshot (400) of the user registration as shown in FIG. 4 is coupled and controlled by the user profile module (210). The screenshot (400) is displayed to users to assign additional facilities and services for the user, either an individual (410) or a group (420). The group can be legal entity like a corporation or an informal or temporary group. The user registration module is configured to collect basic and detailed information (430) from the user directly or indirectly after ascertaining the user identity through standard or customized procedures. The user (101) as soon as registered is allocated a minimum space on the site. The allocated space and features of use can vary based on the policies of the site such as free or paid services or premium services or so on.

Figure 5:
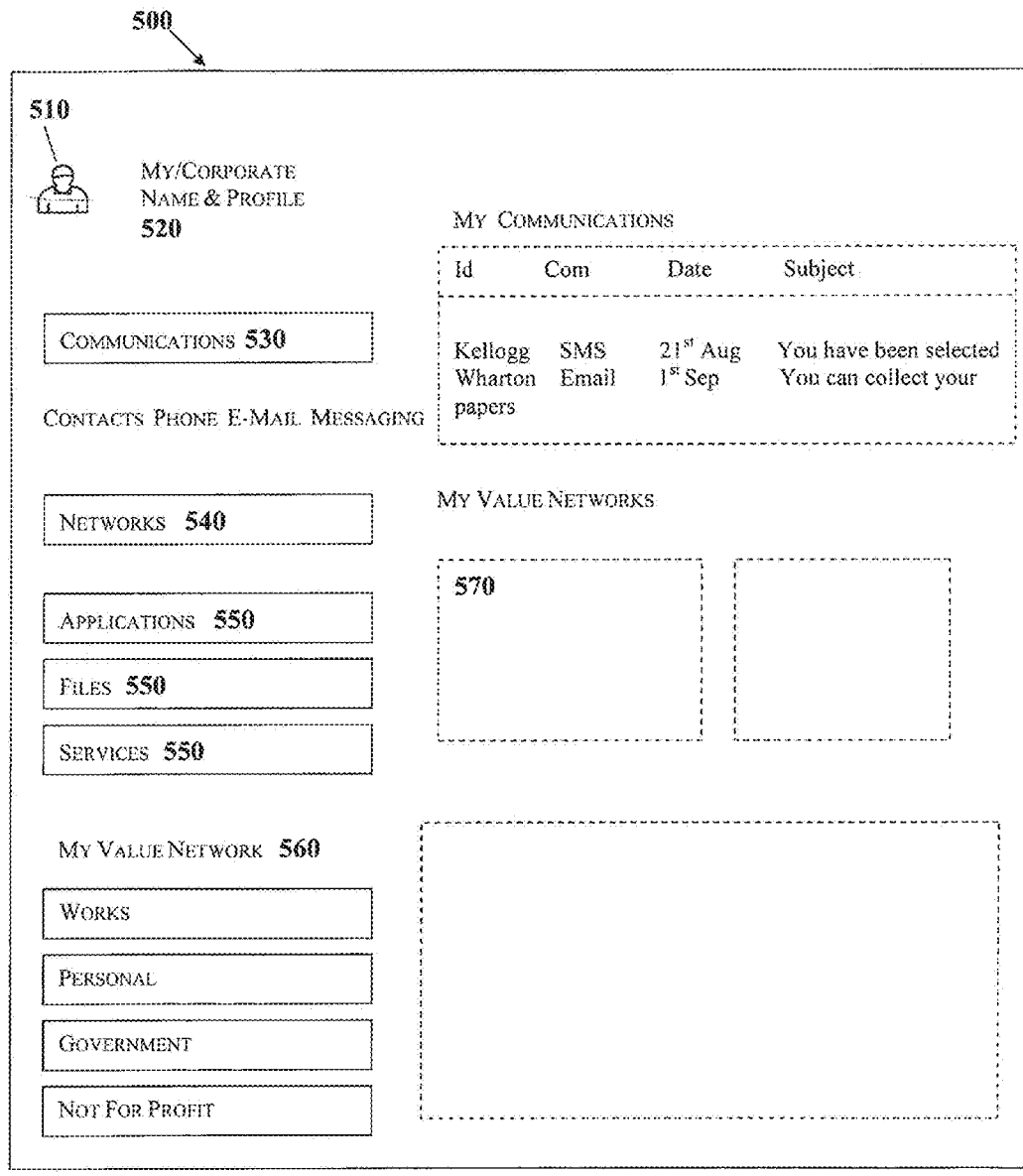
FIG. 5 illustrates an exemplary screenshot of a user home page interface in accordance with an embodiment of the present invention.

FIG. 5 illustrates an exemplary screenshot of a user home page interface in accordance with an embodiment of the present invention.

The screenshot (500) of the user interface (204) as shown in FIG. 5 is customizable by the user (510) (interchangeably referred to user 101). As shown in the screenshot (500), a user brief profile (520) is located/displayed on the vertical left. Further, the screenshot (500) displays a communication tool (530), syncing, networks (540), and personal storage space (550) such as files, applications and value networks (560). The communication tool (530) is coupled and controlled by the communication module (214) described above. The value networks (560) is coupled and handled by the catalog module (206).

In the screenshot (500), on the columnar space to the right is displayed a space where in the user (510) can select subscriptions or RSS feeds of choice from within or outside the platform offered by the GVN server (105) and display/arrange the same in the space indicated (570) as boxes with the specific updates appearing within the box. The updates may be as per date or person specific or category specific or any other.

Figure 6:
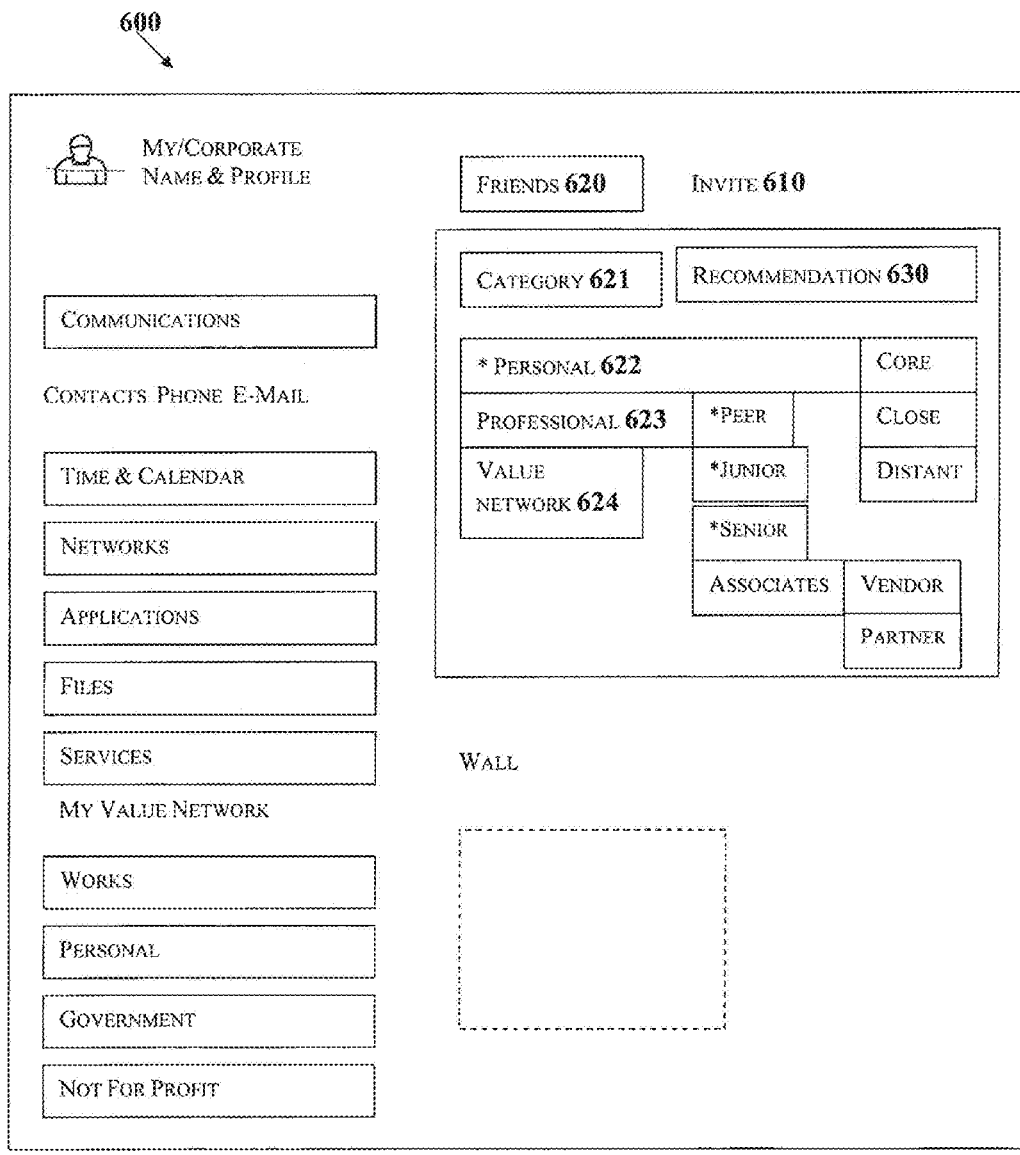
FIG. 6 illustrates an exemplary screenshot of a Network interface in accordance with an embodiment of the present invention.

FIG. 6 illustrates an exemplary screenshot of a Network module in accordance with an embodiment of the present invention.

The screenshot (600) of the network module (216) is shown in FIG. 6. In one embodiment, the network module (216) is configured with a provision for sending and receiving invites (610) from friends and acquaintances (620) within or outside the platform offered by the GVN server (105) through email or mobile or any other media which is linked with the said platform. The network categories (621) can be both personal (622) as well as professional (623) including peers, subordinates, superiors and associates and with features such as recommendations (630) for the network person. In addition, the network module (216) enables creation of networks (624) and networks (624) thus created for the user in terms of contacts within the platform for the particular industry or industries or sub-sector or sub-sectors or function of sub functions or supporting functions or subcomponents thereof or subject or subjects and so on, is also added in this module.

Figure 7:
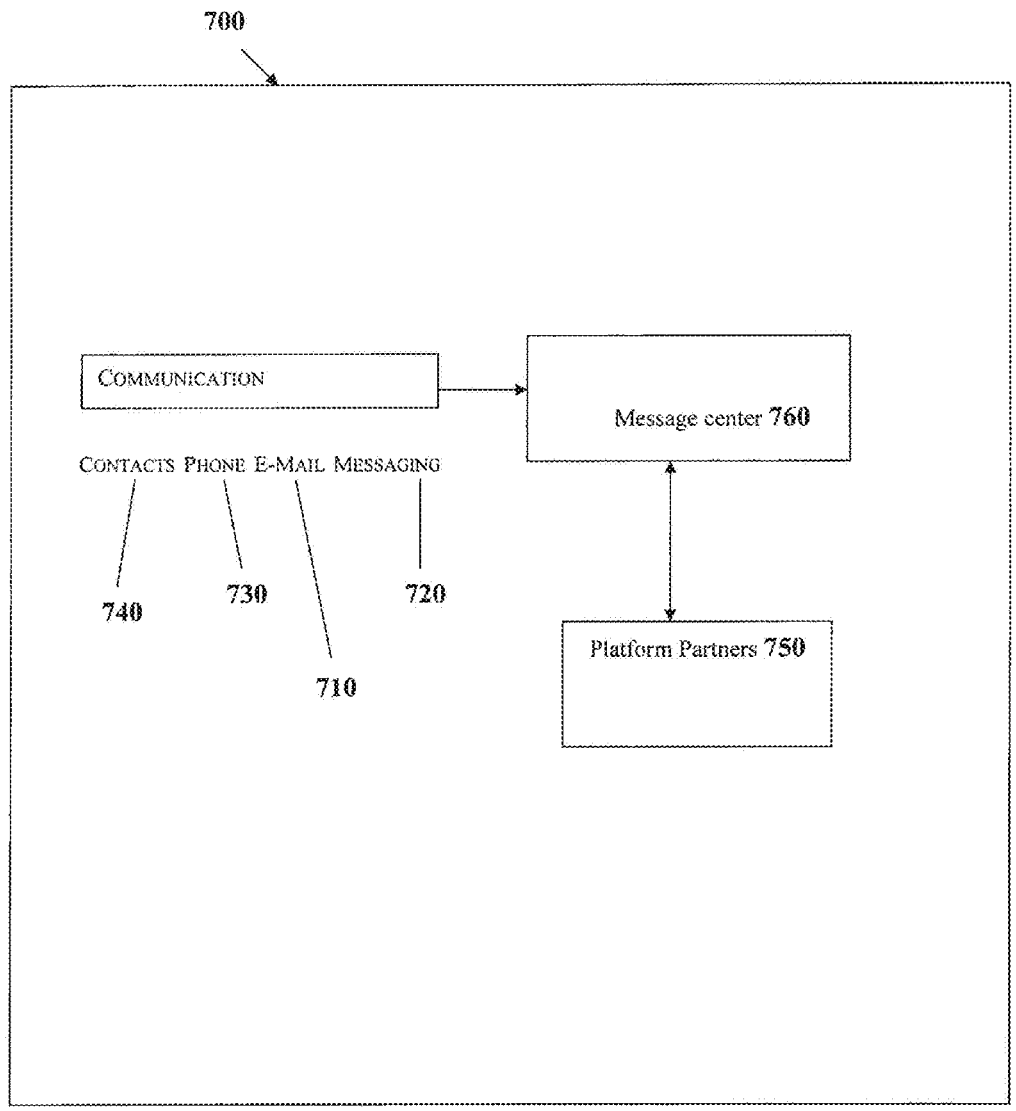
FIG. 7 illustrates an exemplary screenshot of a Communications module in accordance with an embodiment of the present invention.

FIG. 7 illustrates an exemplary screenshot of a Communications module in accordance with an embodiment of the present invention.

The screenshot (700) of the communications module is configured to provide the users (101) with multiple communication modes such as email (710), messaging (720) and voice mail (730), connectivity contacts (740) with the partners (750) of the platform offered by the GVN server (105). The communication module is also configured to provide with a message center (760) that sends, stores and receives messages and alerts from within the platform or outside for the users (101).

Figure 8:
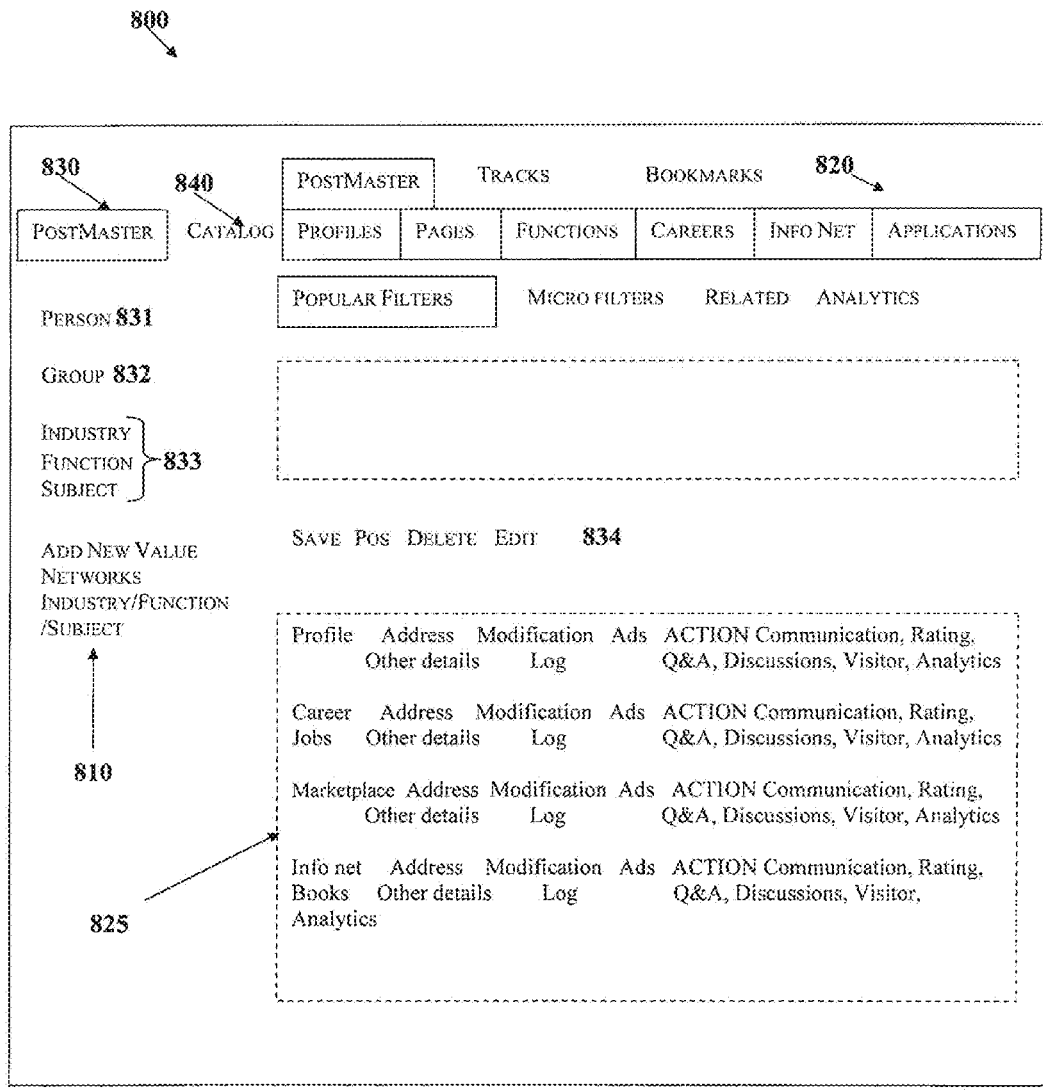
FIG. 8 illustrates a screenshot of a typical user pages interface in accordance with an embodiment of the present invention.

FIG. 8 illustrates a screenshot of a typical user pages interface in accordance with an embodiment of the present invention.

The catalog module (206) is accessed by browsing further the value networks pages or by the action of clicking on the button named for an example, "value network" on the screenshot (600). By the using the page as shown in the screenshot (800), the users may browse, add and manage interface. In one embodiment, the page comprises two options on the left side of the page, the first one is of my value network or Post master (830) which is again classified under person (831) and user defined groups (832). The second option is the global value network or catalog (840). The groups can be created by any member and have set access policies as defined by one or more members as per the authorities defined by the group owner.

The user profile module (210) is configured to create group assigning a separate identity and space for storing resources (documents, multimedia, messages) and interaction (discussions) within the group members or with others outside the groups or to special invitees. The group can also be provided with specialized tools as per the needs of the group by the platform offered by the GVN server (105).

Below the space where tabs "person" and "groups" on the vertical left side of the page is displayed with the user's selection options (833) of industry/ies and subsector/s and or function/s or subject/s appears as default. The user can either add or edit the default to any other selection of choice from the drop down menu appearing beside each item.

On the screenshot (800), few button tabs are arranged horizontally corresponding to profile, pages, career, information net, market place and so on. Each of the horizontal tab/button has its subsections. It may be noted that the arrangement of buttons as horizontal or vertical is only a design consideration and what is being described is only one example. They can be arranged in any manner and all manner of arrangements are to be considered as under the invention.

Below the horizontal main menu (820) are the buttons for managing the posts (834), edit, add or create, delete etc.

The selection of the buttons on vertical (810) or horizontal main menu, displays a window pane (825) with results pertaining to the selection/s. A text displays the count of results available from within the platform for the selection. For example if selection is of my value network and of Food and beverage industry, then all the user postings in different pages are displayed one below the other in the results pane. Each of the result may have a brief summary including title of the post, about, date posted, number of views and so on. It can also have a file, picture, video or audio related to the post.

The user has the option to add a new post in the relevant horizontal button against the chosen selection on the vertical side of either industry or function or subject. The user can also delete any of the posts previously added in any of the pages allotted to the user except when the site policy specifically prohibits any such deletions for certain period of time (for example in case of top ratings for any article posted by the user a copy of which then is transferred to the site's central database after a certain period of time). In addition the user can decide to activate features such as rating, comments, review or edit and so on to the posts for use by either select people or all. The user also can manage these features through options such as delete or hide and so on.

The user is presented with standardized or customizable forms for posting of information under any of the horizontal subsections. In some instances the forms can also be personalized for example uploading of photographs, or other self-generated multimedia. Some of the information may be essential to complete by the user while some of it can be computer generated such as time, user id & profile, value networks.

The user can also check boxes for identifying competitors or add competitors' URL on the site in the space provided for getting updates and analytics on their activities on the platform (interchangeably referred to as site). Alternately the site itself can generate competing posts for a user and present brief updates and analytics to compare against the users posts. The user can manage the analytics feature with options such as add, edit, delete.

Figure 9A:
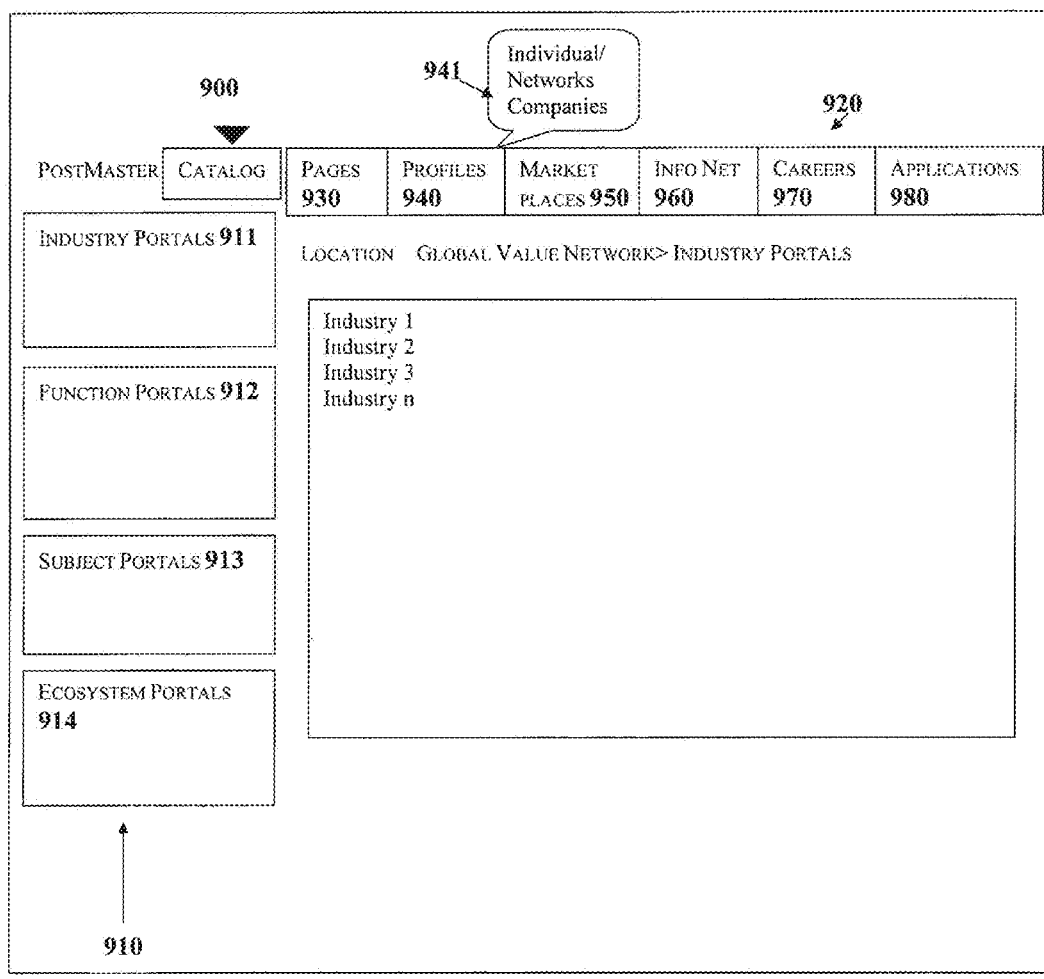
FIG. 9A illustrates a screenshot of a typical global value networks user interface in accordance with an embodiment of the present invention.

FIG. 9A illustrates a screenshot of a global value networks user interface in accordance with an embodiment of the present invention.

The first display screen or catalog (900) as shown in FIG. 9A has a set of buttons arranged vertically (910) and horizontally (920). The vertical buttons (910) take precedence over the horizontal button (920) in case of selection. Vertical buttons (910) can have many elements under menu such as industry, function, subject or components.

Embodiment of industry (911):
The display screen has on the vertical left side a set of menus comprising of Industry which drills down to single or multiple industries that can be selected. After the selection it further opens up into sub-sectors that can be then selected.

Embodiment of functions (912):
There is a function menu (912) below the industry menu which has a drill down of various functions. The function menu can be operated in sequence after selecting subsector or can be selected independently. The function selected opens up to further sub-functions or supporting functions which can then be selected by the user.

Embodiment of Subjects/Components:
Subject element (913) then opens up into further sub components. The subject menu can be operated in sequence after selecting industry or sub-sector or function or can be selected independently.

There may be further elements present on the vertical menu such as Ecosystem (914). Each of the above embodiments apart from that which has been described can also have favorites sections under each main element.

Horizontal buttons (920) can have many elements. One of the embodiments is described here. On the display screen horizontally at the top are lined main buttons such as Pages (930), Profile (940), Marketplace (950), Information net (960), Careers (970), Applications (980) and so on. Each of these can have further sub categories. These are cited only as examples and further buttons can be added or deleted from this set of main menu buttons.

Profile button will have information filled up or available about the users and their network, RSS feeds or subscriptions with all the social networking features as commonly seen. In addition the users will have their value networks selected from within the site based on the industry or function or subject items and sub classes, as chosen by the user and categorized (941).

Careers button will have sub sections which can be selected by the user like jobs, resume, mentors, education and so on.

Applications button will have sub sections like widgets, downloads and so on which can be selected by the user.

Information net button will have further components of data, information and knowledge with further sub components under each such as Statistics, charts & analytics, articles, books, experts cited as examples only.

Pages or wikis button has the section customizable by users. The user can index as per self-generated themes. The user can add a theme and cluster choice items under the theme from within the pages or outside including multimedia such as photos, videos etc. This can be used to highlight a particular topic of interest for the user such as particular product or service or an idea.

This space allows user to customize themes whereas the rest of the software is automated for both clustering and categorizing. Each of the buttons, either vertical or horizontal, selection opens up to view a home page, which has the generic updates of the section such as most popular, most tracked, recent additions, facts and figures but not limited to them. Each of the sections mentioned will have Browse and edit/add functionalities buttons.

FIG. 9B illustrates an exemplary screenshot of user interface of a global value networks in accordance with an embodiment of the present invention.

On clicking the browse button in the first screen, the user is taken to a second display screen (990) which on the left side has vertical drop down menu (995) for industry and the other elements. On selecting the industry of choice, there is a further drop down for selecting sub-sectors. There is option to select functions. Each selected function will have further drop downs for sub components (996) and support components (997) as available from the main database, which can also be selected.

The display screen further has horizontally lined up buttons representing the different features available such as pages, profiles, careers, value chain but not limited to these. The user can click any of these buttons. This opens up another display screen which shows result pages (998) in between the horizontal and vertical buttons as described in the earlier views. A text displays the number of results found for the selection made by the user for the selected feature. The results are displayed one below the other and can be scrolled continuously either vertically or horizontally to arrive at the next set of results. Each set of results in a page is the same as the previous page except the last page which can have results varying between 1 and the number of results in other pages.

In the same screen there is a set of sub buttons horizontally arranged below the main set of horizontal buttons. These correspond for example to macro or popular filters (991), micro filters (992), related (993) and so on which a user may want to narrow down his search by from the general result page displayed.

The macro filter button corresponds to popular filters based on collective usage of the database such as most popular, most tracked mentioned as example but not limited to those. The selection is of any single item at a time. The results display view then changes to display results as per the selection made.

The micro filter button corresponds to technical or advanced filters pertaining to the final horizontal selection made by the user which can be either the main menu or any sub section or further sub section of the menu item. The filters items (9921) appear as drop down which can be drilled further for selection of either single or multiple filters. Based on the user selection the result page view changes to only display results as per the filters selected.

The related button corresponds to other main menu items related to the menu item selected under the particular industry and sub-sector or function or sub functions or sub processes or Subjects or sub sections. For example if the last selection is of funds and funding services under Finance marketplace, under industry Agriculture and subsector food & beverages in the vertical menus, then the related section will have careers, information net, applications, events and so on with aggregation of results pertaining to the selected related section for Funds and funding in Finance in Food & beverages. The user can customize the related section to receive displays of only selected sections/items.

This display screen while depicting results pane as per the selection made by the user, can also have on the right side of screen, a 'similar search' button that on clicking displays results aggregated from searches made by other users with some similarity to the present user or the search pattern.

Figure 9C:
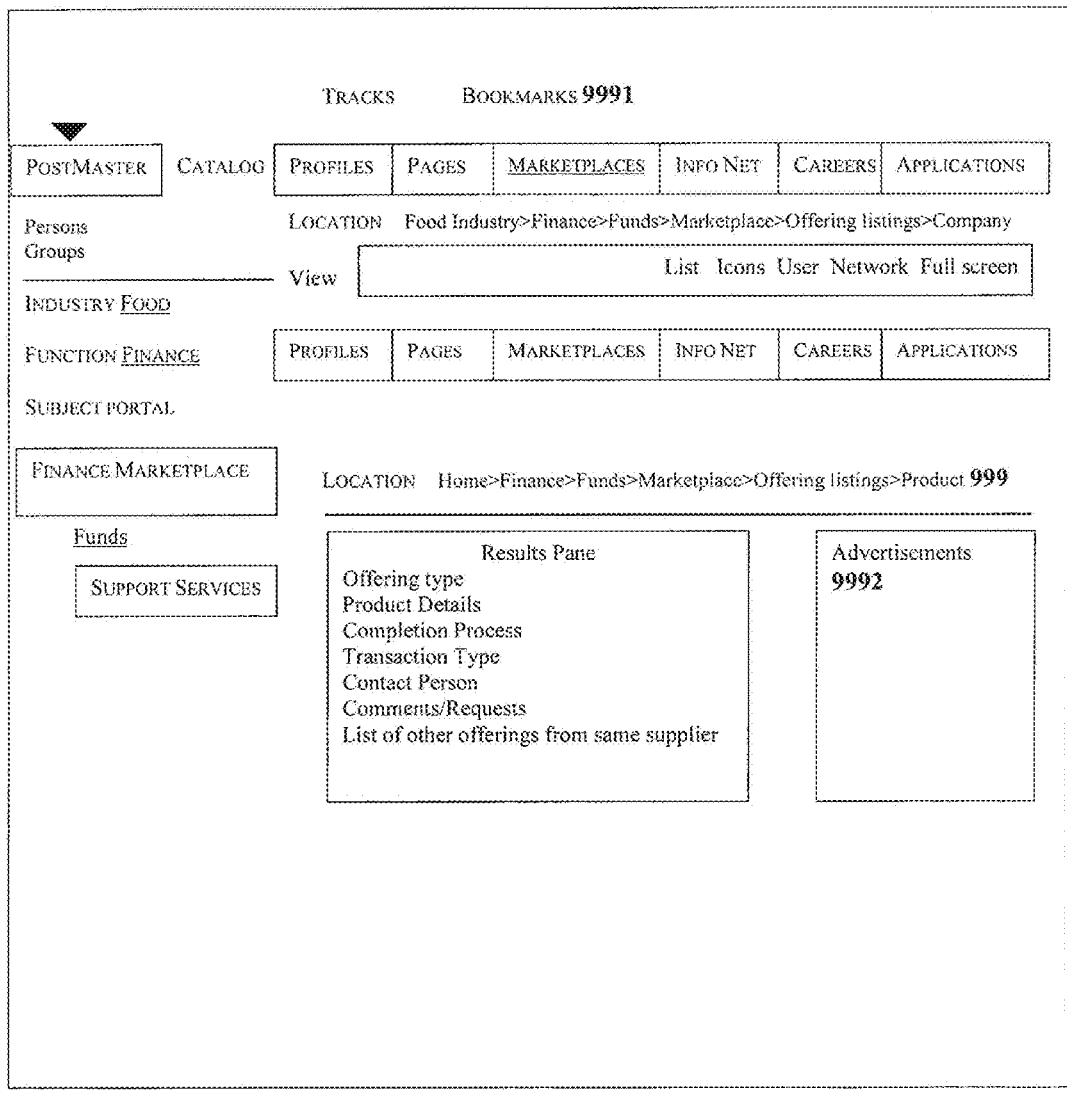
FIG. 9C illustrates an exemplary screenshot of a user page accessed through the catalog by another user in accordance with an embodiment of the present invention.

FIG. 9C illustrates an exemplary screenshot of a user page accessed through the catalog by another user in accordance with an embodiment of the present invention.

Clicking on any result leads the browsing user to the posted entry another user's page. The location or path (999) appears on top end of the page for identifying the browsed user and the location. The browsing user can have the option to interact with the entry with features such as reviews or comments or voting or ratings or recommendations or edit the posted entry where option available and so on.

The user can also choose to bookmark (9991) a particular page or another user or a selection by clicking on the options on the pages and receive regular updates in the user's email box.

The display screen while depicting results pane as per the selection made by the user, can also have on the right side of screen, an advertisements section (9992) which can display one or more advertisements related to the user or the search pattern or specific search.

The display screen while depicting results pane as per the selection made by the user, can also have a search button to enter a key word in order to search either the whole site or the entire web. This can be through any open sourced technology or by selective partnerships.

Figure 10:
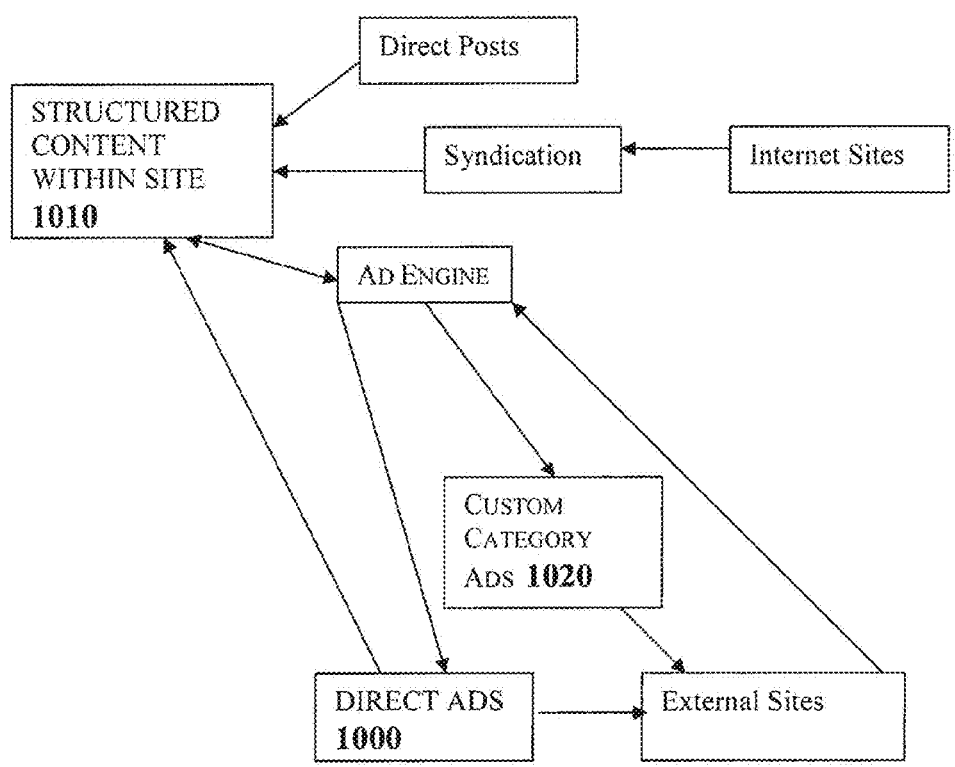
FIG. 10 illustrates a schematic flow diagram of Incentive and Advertisement module in accordance with an embodiment of the present invention.

FIG. 10 illustrates a schematic flow diagram of Incentive and Advertisement module in accordance with an embodiment of the present invention.

The incentive and advertisement module (218) is configured to place direct ads (1000) directly on the structured content on the site (1010) that is obtained either by direct posts or by syndication from other sites. The Direct posts are again spread through structured and custom pages and by widgets within and outside the site. In another method, the site also places ads from partner sites such as Google, Yahoo and others into its structured content while at the same time disseminating its structured content into these sites through custom category advertisements (1020).

Figure 11:
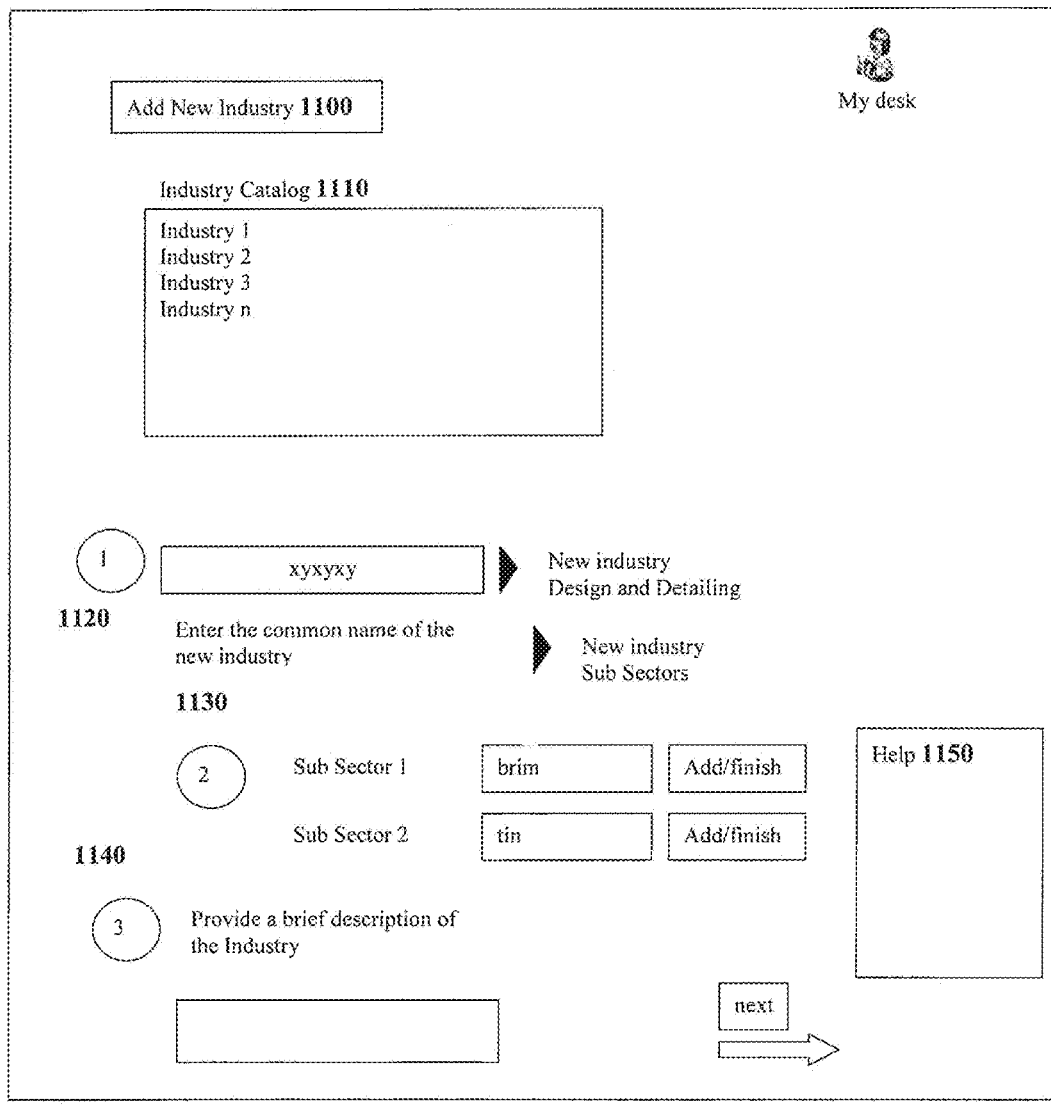
FIG. 11 illustrates an exemplary screenshot showing a schematic flow diagram of a method for updating catalog in accordance with an embodiment of the present invention.

FIG. 11 illustrates an exemplary screenshot showing a schematic flow diagram of a method for updating catalog in accordance with an embodiment of the present invention.

The catalog updation module is configured to enable addition or deletion of catalog elements. In one embodiment, the catalog updation module comprises an industry addition module configured to enable users to add one or more industry elements. In the industry addition module (1100), the view screen depicts a catalog (1110) of industries and sub-sectors. The user with access authority to this pane, can either select any of the listed industry if he wants to elaborate that or can add a new industry (1120).

To add a new industry, the user clicks on the text add new, which opens up a space to be filled with the name of the new industry. In the next step (1130), the user is provided with an option to add the sub-sectors of the new industry. The user adds each name one by one for the sub-sectors and clicks on finish when completed. There is a help section (1150) listing out steps involved in completing the process and also definitions of sub-sectors.

The user then enters the next step (1140) that is presented with an empty space to describe the industry briefly with a character limit. The user is also presented with an empty space to define and describe the sub-sectors within a character limit.

Figure 12A:
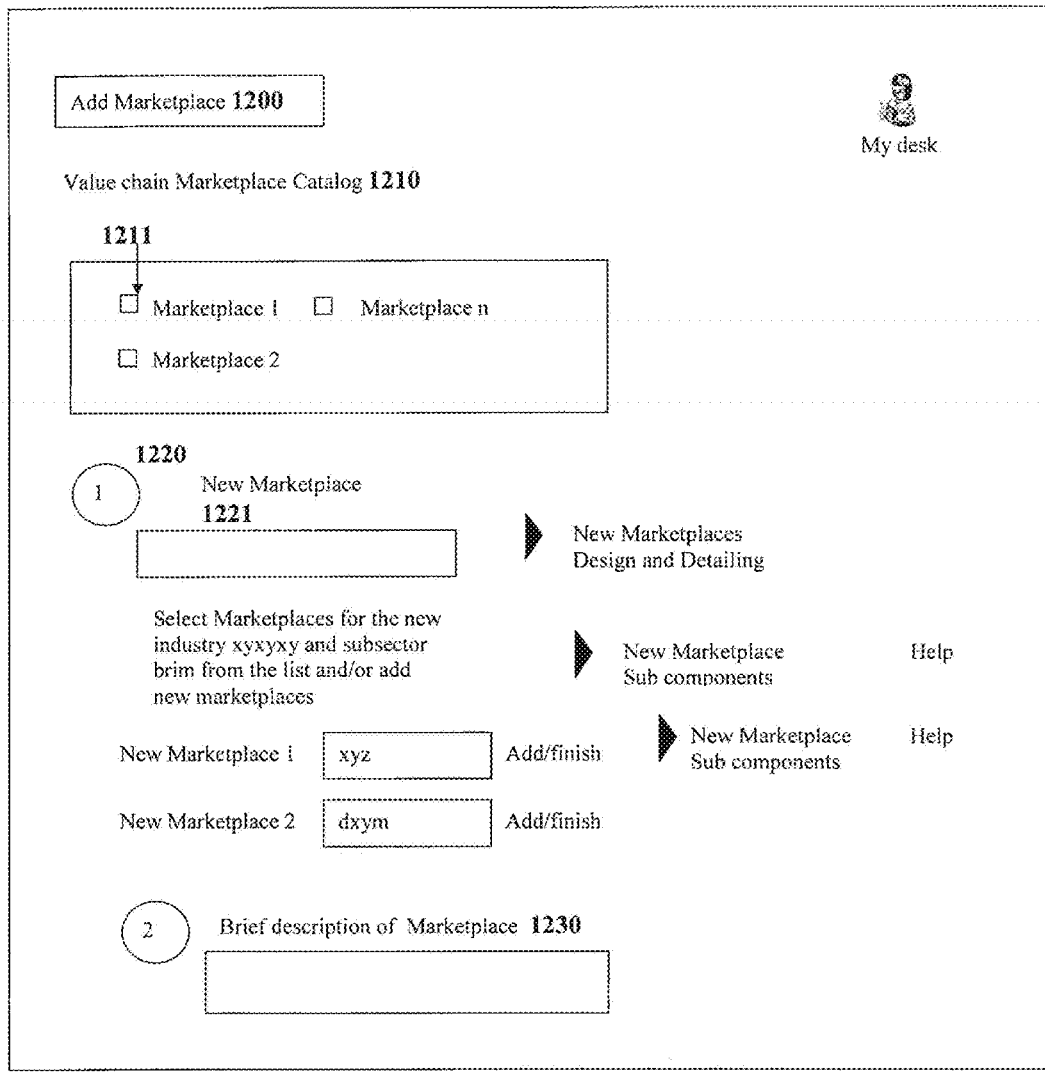
FIG. 12A illustrates an exemplary screenshot showing a schematic flow diagram of a method for addition of new components in accordance with an embodiment of the present invention.

FIG. 12A illustrates an exemplary screenshot showing a schematic flow diagram of a method for addition of new components in accordance with an embodiment of the present invention.

In the catalog updation module (1200), the user elaborates the value chain functions of the new industry or sub-sectors. A catalog (1210) of functions or marketplaces with sub components appears on the screen. The user can either click on the box (1211) on the left of the marketplace name to select any existing marketplace and or click on add marketplace button (1220) at the bottom of the catalog. On clicking the button, an empty space (1221) opens up wherein the user can fill the name of the new marketplace. The user can also add as many marketplaces as applicable for the industry and click on finish once completed the process. In step (1230), the user describes (definition, trends etc.) each of the marketplace added briefly within set character limit.

Figure 12B:
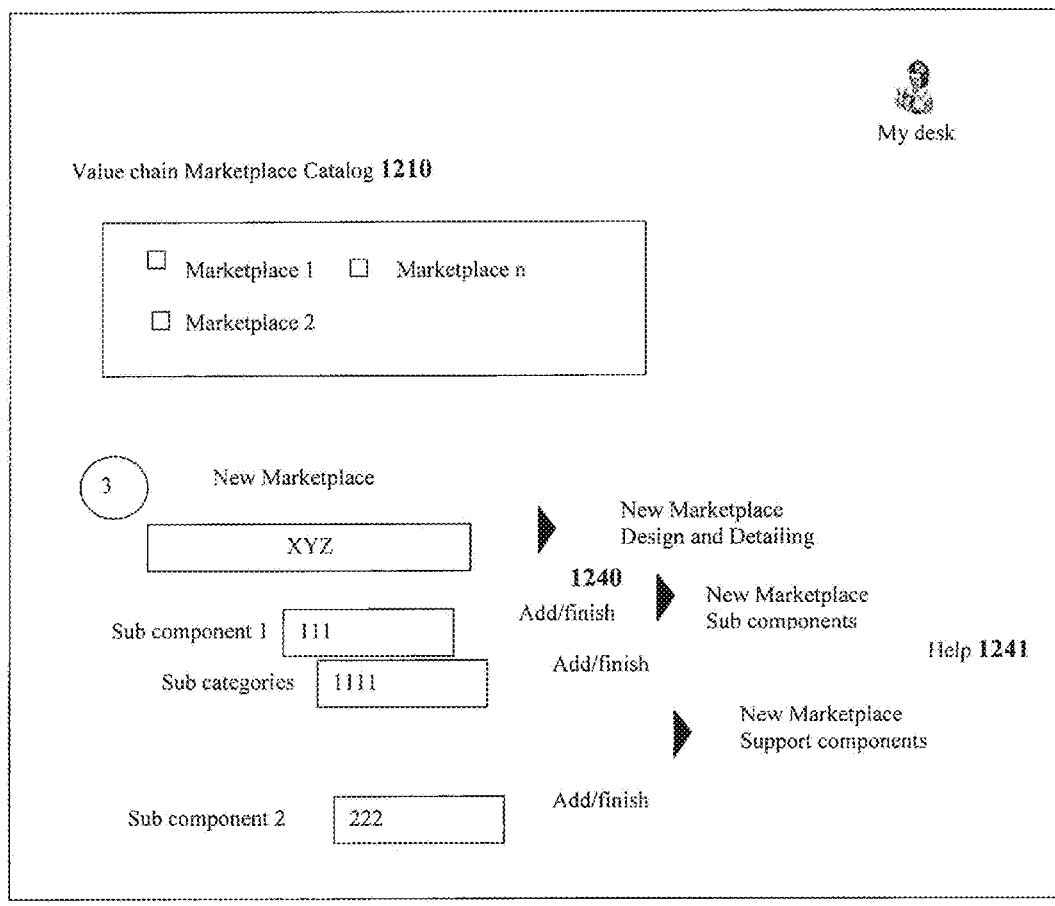
FIG. 12B illustrates an exemplary screenshot showing a schematic flow diagram of a method for addition of new subcomponents in accordance with an embodiment of the present invention.

FIG. 12B illustrates an exemplary screenshot showing a schematic flow diagram of a method addition of new subcomponents in accordance with an embodiment of the present invention.

In the next step (1240), the user is provided with an option to add subcomponents of the marketplaces added or edited. The user can either select the prelisted subcomponents or add new. To add new the user clicks on add new and adds one by one the names of the sub components and when done clicks on finish. The user is provided with a help section (1241) to define the sub components and the number of subcomponents that can be added.

Figure 12C:
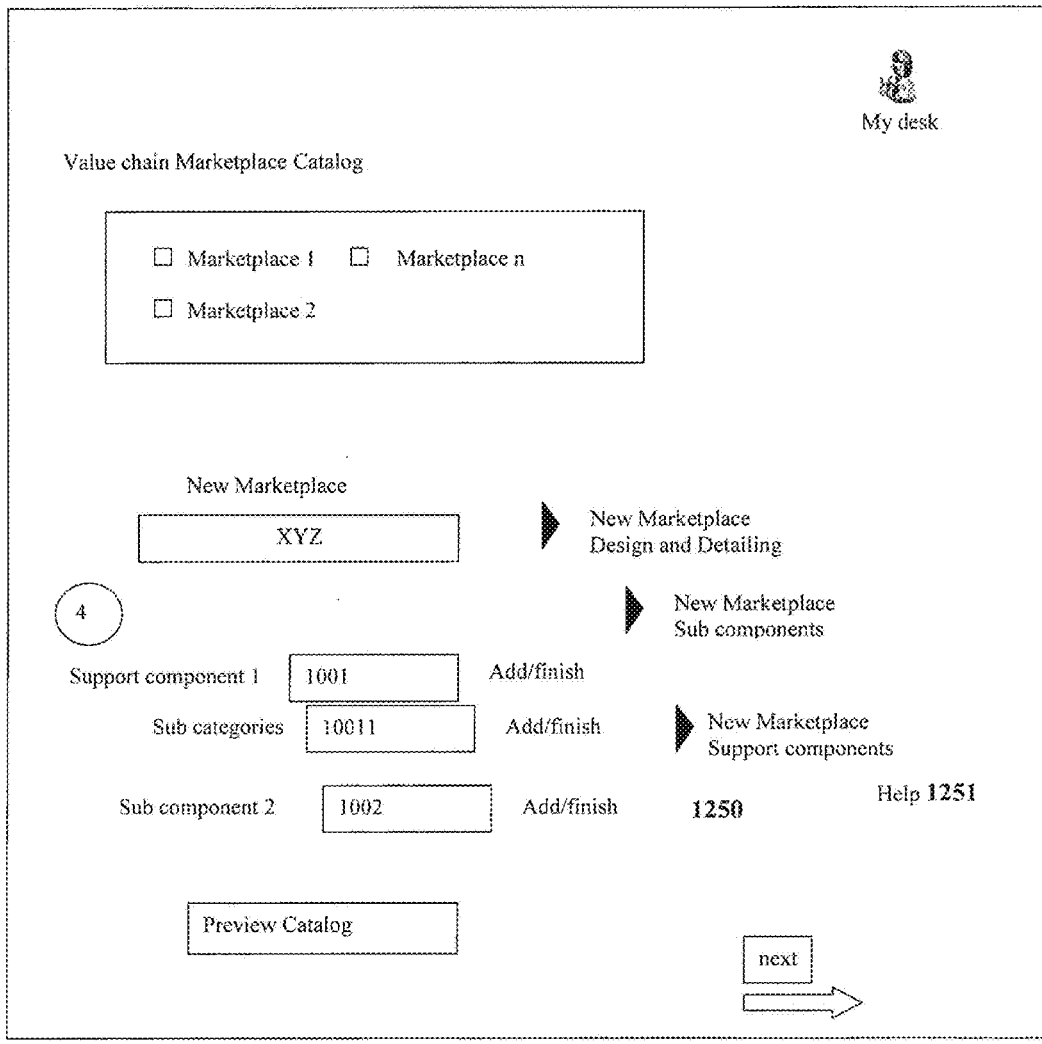
FIG. 12C illustrates an exemplary screenshot showing an exemplary implementation of the method for addition of new support components in accordance with an embodiment of the present invention.

FIG. 12C illustrates an exemplary screenshot showing an exemplary implementation of the method for addition of new support components in accordance with an embodiment of the present invention.

The user then clicks on add new support components (1250) and adds one by one the names of the support components and when done clicks on finish. The user is provided with a help section (1251) to define the support components and the number of support components that can be added.

FIG. 13 illustrates an exemplary screenshot showing an exemplary implementation of the method for preview and addition of icons in accordance with an embodiment of the present invention.

In the preview screen (1300), after completing the steps from FIGS. 11 to 12, the name of the industry (1310) appears at the top center of the screen. Below the name of the industry is displayed the user given description 1320, followed by the sub-sectors' names (1330) horizontally arranged one after the other. Clicking on any of the sub-sectors then presents the description of the subsector (1340) as given by the user followed by the marketplaces or functions (Direct and supporting) (1350) of the subsector. The selection of any marketplace (1351) gives the description (1360) of the marketplace below. The marketplaces/functions on clicking (1370) open up with their respective subcomponents (1371) and support (1372) components. The user can edit (1380) any of the information in the preview screen. The user can then click on add icon (1390) to select and add icons for the industry, sub-sectors, functions, sub components and support components from the icon gallery of the site. They can also skip the step on clicking skip to go to the next screen.

Figure 14:
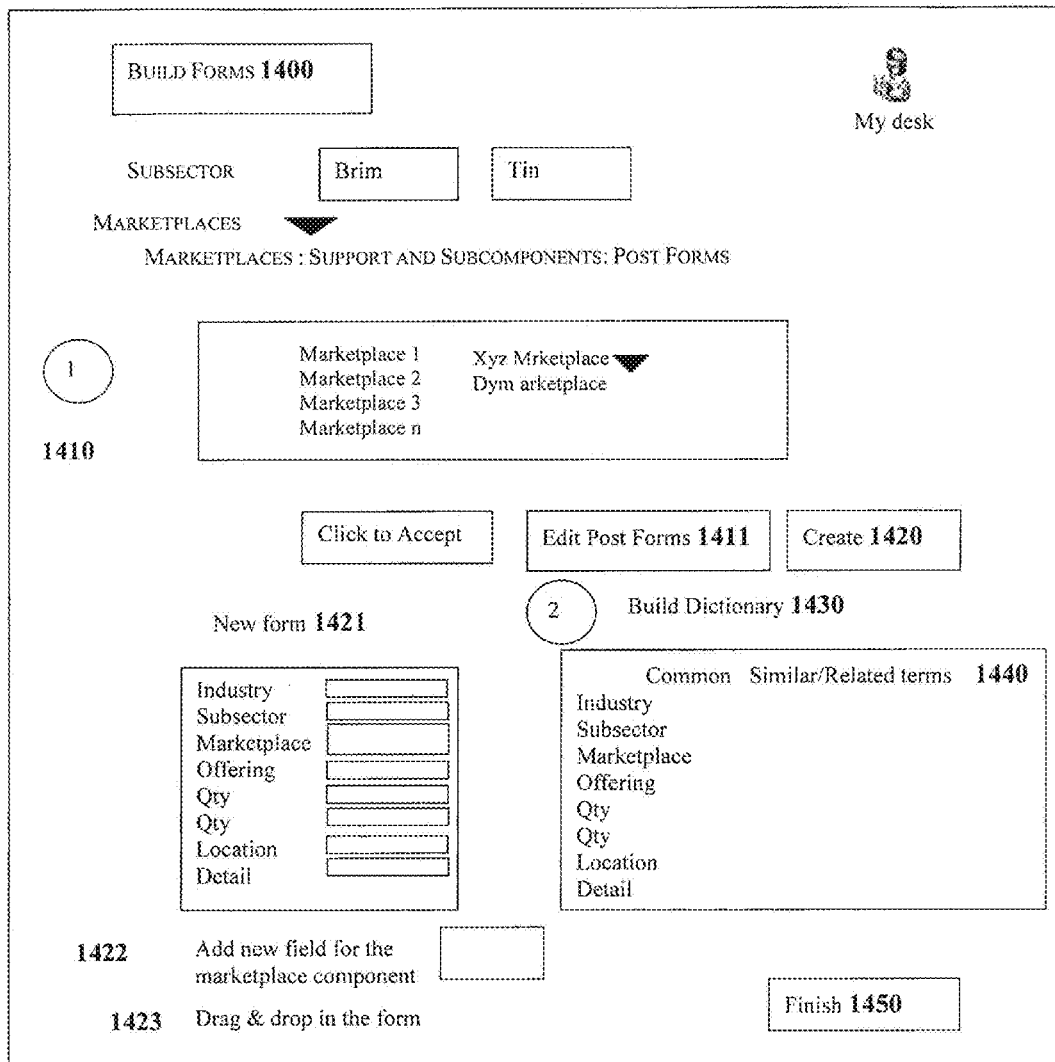
FIG. 14 illustrates an exemplary screenshot showing an exemplary implementation of the method for addition of specific categories for user inputs in accordance with an embodiment of the present invention.

FIG. 14 illustrates an exemplary screenshot showing an exemplary implementation of the method for addition of specific categories for user inputs in accordance with an embodiment of the present invention.

The user views a pane (1400), with the list (1410) of all the sub and support components under each marketplace of the subsector or sub-sectors for the industry. On selecting the component, another screen opens up with options for either editing (1411) a preexisting form or a template form. The user can go through the form and either edit any of the fields present in the form or create (1420) new form (1421) by adding extra fields to the form by drag and drop (1423) of new fields and add the heading or description (1422) of the field title against each empty field on the left side, as relevant for the specific component, one by one. At the end of the process the user can click on submit to complete the process.

In the next step (1430) the user clicks on build dictionary to open up a new screen (1440) with all the fields as in the submitted form by the user. Against each field name, there is a vertical column for common terms and another column to right of this column for related terms. The user can one by one add the information against the selected field in both the columns. At the end of the process, the user can click finish 1450 to complete the process.

The invention can take the form of an entirely hardware embodiment, an entirely software embodiment or an embodiment containing both hardware and software elements. The invention can take the form of a computer program product accessible form, a computer-usable or computer-readable medium providing program code for use by or in connection with a computer or any instruction execution system. For the purposes of this description, a computer usable or computer-readable medium can be any apparatus that can contain, store, communicate, propagate, or transport the program for use by or in connection with the instruction execution system, apparatus or device.

The medium can be electronic, magnetic, optical, electromagnetic, infrared, or semiconductor system or apparatus or device or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W) and DVD.

An exemplary storage medium is coupled to the processor such that the processor can read information from, and write information to, the storage medium. In the alternative, the storage medium may be integral to the processor.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A computer-implemented platform for enabling one or more value networks, said computer-implemented platform comprising:
    a service database comprising a computer-readable medium configured to store information associated with the one or more value networks;
    a user interface coupled with and configured to interact with the service database;
    a search engine coupled with the user interface and configured to perform searches in the service database;
    a catalog module configured to create a catalog that represents a structure of the one or more value networks and store the same in the service database, said catalog comprising one or more data structures including but not limited to one or more primary entities and components of each primary entity, wherein each component is one of a sub-component or a supporting component;
    a role mapping module configured to map the users in the one or more value networks on the platform, wherein the role mapping module is further configured to, for each respective interaction of a plurality of interactions each comprising one or more actions by a plurality of users, perform the following steps:
        a. receive the one or more actions comprising the respective interaction from the plurality of users and store the actions thus received in a service database;
        b. evaluate the actions based on one or more predetermined conditions stored previously in the service database;
        c. determine the role of each of the plurality of users for the respective interaction on the basis of evaluation of the actions comprising the interaction; and
        d. map each of the plurality of users against the role thus determined, thereby mapping each of the plurality of users on the one or more value networks;
    wherein the role mapping module is configured to separately determine the role of each of the plurality of users for each interaction by performing the steps of:
        e. determining a source user/entity and a target user/entity for each interaction;
        f. determining a degree of separation between the source and target users/entities based on the evaluation of the interaction; and
        g. assigning a predetermined role to each of the source and target users/entities based on the degree of separation thus determined or based on the position of selection in the catalog; and
    a processing unit configured to control the user interface, the search engine, the catalog module, and the role mapping module and configured to enable access to the service database.

2. The platform according to claim 1, wherein the catalog module comprises a catalog creation module configured to create the catalog, said catalog comprising one or more primary entities, and one or more components for each primary entity, said component is one of sub-component and supporting component, each sub-component and supporting component further comprises sub-component and supporting component and so on.

3. The platform according to claim 1, wherein the catalog module further comprising a user admin module configured to enable users to edit and modify the catalog based on user preferences.

4. The platform according to claim 1, further comprising a user module comprising:
   a. an interaction module;
   b. a user profile module; and
   c. a network module.

5. The platform according to claim 4, wherein the interaction module is configured to enable users to perform said actions, said actions including but not limited to a selection of one or more of a primary entity, sub-component or supporting component and so on.

6. The platform according to claim 4, wherein the interaction module further comprising a content module configured to create content based on user actions and share the content with other users, said content module comprises tools including but not limited to create, post, edit, delete, track, browse, filter, list, view, exchange and use of content.

7. The platform according to claim 6, wherein the content include but not limited to ideas, concepts, product, service, project, documents, audio, video, bookmarks, snippets, how to guides, news, articles, knolls, numbers and charts, books and publications, blogs, discussions, debates and so on.

8. The platform according to claim 4, wherein the interaction module further comprising a transaction module configured to enable one or more actions including but not limited to transactions, trading, buying, selling, and/or offering.

9. The platform according to claim 4, wherein the interaction module further comprising a communication module configured to enable actions including communication between users via email, messages and voice mail.

10. The platform according to claim 4, wherein the network module comprises a network creation and updation module, said network creation and updation module configured to perform the following steps:
   a. create networks, invite members and assign permissions to members;
   b. visualize and track changes and actions of user's networks;
   c. manage communications with networks;
   d. create, edit, post, delete content as a group/network;
   e. add, delete, group, visualize, list and track desktop widgets; and
   f. add, delete, group, visualize, list and track applications.

11. The platform according to claim 6, wherein the content module is configured to perform the following steps:
   a. post, edit and delete content within and outside the network;
   b. visualize, analyze and track content changes;
   c. classify content;
   d. manage privacy of content;
   e. rate and comment on content;
   f. share and recommend content within and outside the network;
   g. create fields to classify and list the content;
   h. filter, visualize content listings and related listings in different ways; and
   i. read, copy, edit, save content in the service database.

12. The platform according to claim 4, wherein the user profile module comprises a user registration and updation module to create a user account/profile and update the same by the user.

13. The platform according to claim 12, wherein the user profile module is further configured to perform the following steps:
   a. create, edit, delete, classify, post profile of individuals, groups, organizations, and manage privacy of posts;
   b. browse, create, invite, collaborate, add, edit, delete, group-people, groups, organizations and assign roles/permissions and so on; and
   c. track value networks.

14. The platform according to claim 12, wherein the user profile module further comprising a user login module configured to enable the user to login onto the platform and then validate the authentication of the user login.

15. The platform according to claim 4, further comprising an incentive and advertisement module configured to earn and provide incentives to users interacting with the one or more value networks and further configured to enable/disable display of advertisements posted by users or sourced from outside the system.

* * * * *